United States Patent
Damola et al.

(10) Patent No.: US 9,220,051 B2
(45) Date of Patent: Dec. 22, 2015

(54) METHOD AND APPARATUS FOR ENABLING DNS REDIRECTION IN MOBILE TELECOMMUNICATION SYSTEMS

(75) Inventors: Ayodele Damola, Solna (SE); Lars Westberg, Enköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 135 days.

(21) Appl. No.: 13/985,202

(22) PCT Filed: Nov. 8, 2010

(86) PCT No.: PCT/IB2010/055069
§ 371 (c)(1),
(2), (4) Date: Aug. 13, 2013

(87) PCT Pub. No.: WO2012/063099
PCT Pub. Date: May 18, 2012

(65) Prior Publication Data
US 2013/0336221 A1    Dec. 19, 2013

(51) Int. Cl.
*H04W 4/00* (2009.01)
*H04W 40/34* (2009.01)
*H04L 29/12* (2006.01)
*H04W 8/26* (2009.01)
*H04W 88/12* (2009.01)

(52) U.S. Cl.
CPC ......... *H04W 40/34* (2013.01); *H04L 29/12066* (2013.01); *H04L 29/12433* (2013.01); *H04L 61/1511* (2013.01); *H04L 61/2539* (2013.01); *H04L 29/12367* (2013.01); *H04L 61/2514* (2013.01); *H04W 8/26* (2013.01); *H04W 88/12* (2013.01)

(58) Field of Classification Search
CPC ................. H04L 29/12433; H04L 29/12066; H04L 61/2539; H04L 61/1511; H04L 67/18; H04L 67/1036; H04L 67/1002; H04L 43/0864; H04L 63/0853; H04L 61/154441; G06F 21/35; G06Q 30/04
See application file for complete search history.

(56) References Cited

U.S. PATENT DOCUMENTS 6,108,703 A    8/2000 Leighton et al.
7,099,957 B2 *  8/2006 Cheline et al. ................. 709/245
(Continued)

FOREIGN PATENT DOCUMENTS

CN      101471964 A      7/2009
WO      2010/106390 A1   9/2010

OTHER PUBLICATIONS

3rd Generation Partnership Project; Technical Specification Group Services and System Aspects; Local IP Access and Selected IP Traffic Offload (Release 10); 3GPP 23.829 v1.0.1 (Mar. 2010), pp. 1-37.
International Search Report issued in corresponding International application No. PCT/IB2010/055069, date of mailing Jul. 21, 2011.
(Continued)

*Primary Examiner* — Brian O'Connor
(74) *Attorney, Agent, or Firm* — Patent Portfolio Builders PLLC

(57) ABSTRACT

System and method for providing DNS redirection in mobile telecommunication network. The system includes a functionality that is capable of intercepting a DNS reply from a content delivery provider, extracting a token, comparing the token with a stored token and replacing an IP address associated with the content delivery provider with an IP address of a resource of the mobile telecommunication network.

32 Claims, 12 Drawing Sheets

(56) References Cited

U.S. PATENT DOCUMENTS

| | | | | |
|---|---|---|---|---|
| 7,574,499 | B1* | 8/2009 | Swildens et al. | 709/223 |
| 7,949,785 | B2* | 5/2011 | Alkhatib et al. | 709/245 |
| 7,995,994 | B2* | 8/2011 | Khetawat et al. | 455/410 |
| 8,073,468 | B2* | 12/2011 | Wang et al. | 455/456.3 |
| 8,085,810 | B2* | 12/2011 | Kovvali et al. | 370/466 |
| 8,326,980 | B2* | 12/2012 | Huang et al. | 709/224 |
| 8,509,431 | B2* | 8/2013 | Schmidt et al. | 380/44 |
| 8,532,606 | B2* | 9/2013 | Sim | 455/404.1 |
| 8,533,803 | B2* | 9/2013 | Cha et al. | 726/8 |
| 8,676,989 | B2* | 3/2014 | Treuhaft et al. | 709/227 |
| 8,732,309 | B1* | 5/2014 | Richardson et al. | 709/226 |
| 8,812,377 | B2* | 8/2014 | Ljunggren et al. | 705/27.1 |
| 8,898,221 | B2* | 11/2014 | Melander et al. | 709/203 |
| 8,937,908 | B2* | 1/2015 | Damola et al. | 370/328 |
| 2005/0289241 | A1* | 12/2005 | Ruiz | 709/245 |
| 2010/0034218 | A1 | 2/2010 | Kovvali et al. | |
| 2011/0055312 | A1* | 3/2011 | Purdy, Sr. | 709/203 |
| 2012/0072228 | A1* | 3/2012 | Pankajakshan et al. | 705/1.1 |
| 2012/0113893 | A1* | 5/2012 | Damola | 370/328 |

OTHER PUBLICATIONS

Written Opinion of the International Searching Authority issued in corresponding International application No. PCT/IB2010/055069, date of mailing Jul. 21, 2011.

Rodriguez, Pablo et al., "Session Level Techniques for Improving Web Browsing Performance on Wireless Links,"ACM, 2 Penn Plaza, Suite 701, New York, NY, May 17, 2004, pp. 121-130, XP040180034.

Shaikh, Anees et al., "On the Effectiveness of DNS-based Server Selection," Proceedings IEEE INFOCOM 2001 Conference on Computer Communications, 20th Annual Joint Conference on the IEEE Computer and Communications Society (Cat. No. 01CH37213), vol. 3, Apr. 22, 2001, pp. 1801-1810,XP010538874, DOI:10.1109/INFOCOM.2001.916678; ISBN:978-0-7803-7016-6.

Srisuresh, P. et al., "DNS extensions to Network Address Translators (DNS_ALG) <draft-ietf-nat-dns-alf-03.txt", IEFT Standard-Working-Draft, Internet Engineering Task Force, IETF, CH, vol. nat. No. 3, Jun. 1, 1999, XP015024044, ISSN:0000-0004.

English Translation of Chinese Search Report in corresponding Chinese Application No. 201080070035.2 dated May 19, 2015.

* cited by examiner

10

METHOD AND APPARATUS FOR ENABLING DNS REDIRECTION IN MOBILE TELECOMMUNICATION SYSTEMS

TECHNICAL FIELD

The present invention generally relates to systems, software and methods and, more particularly, to mechanisms and techniques for enabling domain name server (DNS) redirection in a mobile telecommunication system.

BACKGROUND

During the past years, the evolution of various portable devices, e.g., mobile phones, personal digital assistants, etc. was driven by the idea of adding "smart" features. The smart features include, among other things, the capability to browse the Internet while on the move. For directing the end user requests to the best server for fetching the desired content, the Internet based content delivery network (CDN) companies, e.g., Akamai, use DNS redirection. The best location of the server may be expressed based on various parameters, e.g., closest topological proximity, shortest time to live (RTT), least load of the server, etc.

While the DNS redirection works well in the public Internet, there are some challenges in ensuring DNS redirection operation in mobile telecommunication networks, e.g., third generation (3G) or Long Term Evolution (LTE) networks. These mobile telecommunication networks are built in such a way that an identity of a mobile phone (e.g., IP address) may not be visible from outside the network. Thus, a CDN company cannot provide the best server for the mobile phone as the CDN company cannot "see" the internal structure of the mobile network. As the mobile telecommunication networks have their own content servers (caches) which may be used in response to the requests of the mobile phones and because the CDN companies do not see these servers, little use is currently made of these content servers by CDN companies.

A brief discussion about the DNS is believed to be in order here for a better understanding of the exemplary embodiment. Domain name service is a know Internet service which is used to resolve fully qualified domain names (FQDNs) to Internet protocol (IP) addresses (this is defined in RFC 1034 and RFC 1035, see http://www.ietf.org). A format of a traditional DNS query message 10 is shown in FIG. 1 and it includes a header field 12, a question field 14, an answer field 16, an authority field 18, and an additional field 20. The question field 14 of the header 10 includes a QNAME field 22 as shown in FIG. 2. The QNAME field may carry the name of the resource which is to be resolved.

DNS redirection is used in the Internet to facilitate selection of cache servers based on DNS resolution mechanisms. Various CDN companies use these techniques extensively. For example, such companies (e.g., Akamai) require their customers to modify their web pages to explicitly write in their universal resource locator (URL) a domain name pointing to Akamai servers. A special tool may be used for this conversion. For example, Akamai have used to "akamize" the URLs of its customers with such a tool. However, this particular company uses today a technique (CNAMing) whereby the customers delegate ownership of their domain name to Akamai.

For example, CNAMing involves configuring the DNS of client xyz so that a request for www.xyz.com corresponds to CNAME www.xyz.com.edgesuite.net. Then, the client or content originator (e.g., xyz.com) modifies its content by embedding URLs references to the new domains created by Akamai, for example, <img alt="Building on the past" src="/res/the company/images/2009/091110_history_180× 90.jpg"/>. The content of xyz is either pulled or pushed into the Akamai caches so that both xyz and Akamai have control over load distribution. In the following, the term "content originator" refers to those companies or web sites that create (originate) the content and the term "content delivery provider" refers to those services that at least distribute (provide) the existing content to the users (e.g., Akamai, YouTube). Thus, a content delivery provider may not generate the content (Akamai) or may generate the content (YouTube) in addition to delivering the content.

The CNAMing DNS resolution flow is illustrated in FIG. 3. FIG. 3 shows that a user device 30 uses a browser to request a web page with an embedded image from xyz. The user device 30 sends to a local DNS 32, in step A1, a DNS query for a desired content (e.g., xyz.com). The local DNS 32 transmits the query in step A2 to a DNS 36 of the xyz web server 38. It is noted that the local DNS 32 is part of the communication network to which the user device 30 belongs to. The local DNS is sometimes called ISP DNS and it is provided inside the operator's network (fixed or mobile) and it is responsible for name resolution of domain names of the operator. The IP address of the local DNS server is provisioned in all the user devices that connect to the operator's network (e.g., via dynamic host configuration protocol (DHCP)), i.e., the user devices are aware of its existence. On the contrary, a root DNS 34 is a general server, e.g., this is a public DNS server of the Internet and it is located in the public Internet.

In step A3, the xyz DNS 36 returns to the local DNS 32 an URL associated with the CDN delivery provider 40 and the xyz web site. In step A4, the local DNS 32 sends a DNS query to the CDN delivery provider 40 and receives in step A5 another URL associated with the CDN delivery provider 40. The local DNS 32 sends in step A6 a DNS query with the received URL to the CDN delivery provider 40. After exchanging a few messages in steps A7 to A9 with the CDN delivery provider 40 (which may include one or more servers) for receiving the IP of the cache having the desired content, the local DNS 32 sends in step A10 the IP of the cache of the CDN delivery provider 40 having the desired content to the user device 30. Finally, in step A11, the user device 30 sends a request for the desired content to the CDN delivery provider 40 and receives in step A12 that content from a corresponding cache of the CDN delivery provider 40.

As mentioned above, another method currently used by some CDN delivery providers (e.g., Akamai) is to modify the URLs of the content originator (e.g., xyz). Using again the example of Akamai and xyz (please note that other content delivery providers and content originators may be used), the URLs of xyz may be Akamaized in the following manner. The domain xyz.com may use a special tool to Akamaize all links in its web pages, i.e., the Akamai domain name is placed in all URLs. For example, a conventional URL pointing to a picture on the xyz web site is <img src=http://xyz.com/Ads/adinfo_top.gif . . . > and becomes <img src=http://a868.g.akamai.net/cnwk.1d/Ads/adinfo_top.gif . . . > after being akamaized. The new URL includes now a reference to akamai.net.

The akamaized URL DNS resolution flow is illustrated in FIG. 4. FIG. 4 is similar to FIG. 3 and for this reason the steps of FIG. 4 are not repeated here.

A common feature of the existing DNS based redirection systems is the refiance on the local DNS server identity as well as the IP address of the requesting client to select the closest cache that has the desired content and/or to improve the quality of experience (QoE). However, if the caches storing the desired content are deployed inside the telecommunication network, for example, below the Gateway GPRS support node GGSN (GGSN) in a 3GPP network (e.g., at the radio network control (RNC) level), the current mechanisms (e.g., Akamai) for cache selection will fail. One of the reasons for this is that the GGSN is the IP anchor point for all IP entities below itself. Examples of the state of the art include Rodiguez et al., "Session Level Techniques for Improving Web Browsing Performance on Wireless Links," ACM, 2 Penn Plaza, Suite 701, New York, USA; Shaikh A at al., "On the effectiveness of DNS-based server selection," Proceedings IEEE INFOCOM 2001, Conference on Computer Communications, Twentieth Annual Joint Conference of the IEEE Computer and Communications Society (Cat. No. 01CH37213), [Proceedings IEEE INFOCOM. The Conference on Computer Communications], PISCAT, Vol. 3, 22 Apr. 2001 (2001 Apr. 22), pages 1501-1810; and Srisuresh P et al., "DNS extensions to Network Address Translators (DNS_AIL), draft-ietf-nal-nat-dns-alg-03.txt," IETF Standard-Working-Draft, Internet Engineering Task Force, IETF, CH, vol. nat. no. 3, 1 Jun. 1999 (1999 Jun. 1).

Accordingly, it would be desirable to provide devices, systems and methods that avoid the afore-described problems and drawbacks.

SUMMARY

Assets as, for example, content are desired to be provided to the users from locations that are most suitable to the users. A suitable location may be a location that is closest to the user. In this way, receiving the content from a location closest to the user frees bandwidth in the network and/or reduces a time for receiving the asset.

According to one exemplary embodiment, there is a radio a radio network controller of a mobile telecommunication network, the radio network controller being configured to transfer a content delivery provider domain name system, DNS, reply from a content delivery provider outside the mobile telecommunication network to a mobile terminal connected to the mobile telecommunication network. The radio network controller includes an interface configured to receive the content delivery provider DNS reply and circuitry connected to the interface and configured to extract a token from the content delivery provider DNS reply, where the token was introduced into the content delivery provider DNS reply by the content delivery provider. The circuitry is configured to intercept the content delivery provider DNS reply when arriving from the content delivery provider, compare the token with a stored token, and replace in the content delivery provider DNS reply an internet protocol, IP, address associated with a cache in the content delivery provider with a preset IP address associated with a resource associated with the radio network controller when there is a match between the token and the stored token. The interface is configured to send to the mobile terminal the content delivery provider DNS reply with the preset IP address instead of the content delivery provider's cache IP address.

According to another exemplary embodiment, there is a method for enabling domain name system, DNS, redirection in a mobile telecommunication network. The method includes receiving, at a radio network controller, a content delivery provider DNS reply from a content delivery provider located outside the mobile telecommunication network; intercepting the content delivery provider DNS reply; extracting a token from the content delivery provider DNS reply; comparing the extracted token with a stored token in the radio network controller; replacing in the content delivery provider DNS reply, an internet protocol, IP, address of the content delivery provider with a preset IP address when there is a match between the extracted token and the stored token; and sending from the radio network controller the modified content delivery provider DNS reply to a mobile terminal.

According to still another exemplary embodiment, there is a radio network controller in a mobile telecommunication network, the radio network controller being configured to transfer a content delivery provider domain name system, DNS, message from a content delivery provider outside the mobile telecommunication network to a mobile terminal connected to the mobile telecommunication network. The radio network controller includes an interface configured to receive the content delivery provider DNS reply and a routine configured to run on a processor to intercept the content delivery provider DNS reply when arriving from the content delivery provider, extract a token from the content delivery provider DNS reply, compare the extracted token with a stored token, and replace in the content delivery provider DNS reply an internet protocol, IP, address of the content delivery provider with a preset IP address when there is a match between the extracted token and the stored token. The interface is configured to send to the mobile terminal the content delivery provider DNS reply with the preset IP address instead of the content delivery provider IP address.

According to another exemplary embodiment, there is a method for distributing content from a content delivery provider to a mobile terminal of a mobile telecommunication network. The method includes receiving, at a domain name server, DNS, of the content delivery server, a DNS request from the mobile terminal for a given content that is associated with a first internet protocol, IP, address; determining whether the mobile telecommunication network associated with a radio network controller serving the mobile terminal has the requested given content; and inserting, at the content delivery provider, a token in a DNS reply message sent from the content delivery provider to the mobile terminal, wherein the token indicates whether or not content requested by the mobile terminal is available in the mobile telecommunication network.

According to yet another exemplary embodiment, there is a domain name system, DNS, server of a content delivery provider configured to redirect a mobile terminal of a mobile telecommunication network. The DNS server includes an interface configured to receive a DNS request from the mobile terminal for a predetermined content that is associated with a first internet protocol, IP, address of a content server of the content delivery provider and a processor connected to the interface. The processor is configured to determine whether a mobile telecommunication network having a radio network controller associated with the mobile terminal has the requested predetermined content, and to insert a token in a DNS reply message sent from the content delivery provider to the mobile terminal, where the token indicates whether or not the mobile telecommunication network includes a resource that stores the requested predetermined content.

It is an object to overcome some of the deficiencies discussed in the previous section and to provide a node in a telecommunication network with the capability of discovering a suitable location of desired content for a mobile terminal. One or more of the independent claims advantageously provides a novel redirection procedure for providing the mobile terminal with the desired content from a server located inside the telecommunication network.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of DNS and RNC.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a module and a method for intercepting DNS replies that come to an RNC in a mobile telecommunication network and for modifying these replies prior to being transmitted to a mobile terminal if necessary. This feature enables the RNC to provide an indication to the mobile terminal for obtaining desired content from content servers located below the GGSN (e.g., collocated with the RNC). In one application, a functionality for running the CDN provider's software in nodes below the GGSN is described in the following exemplary embodiments.

Figure 5:
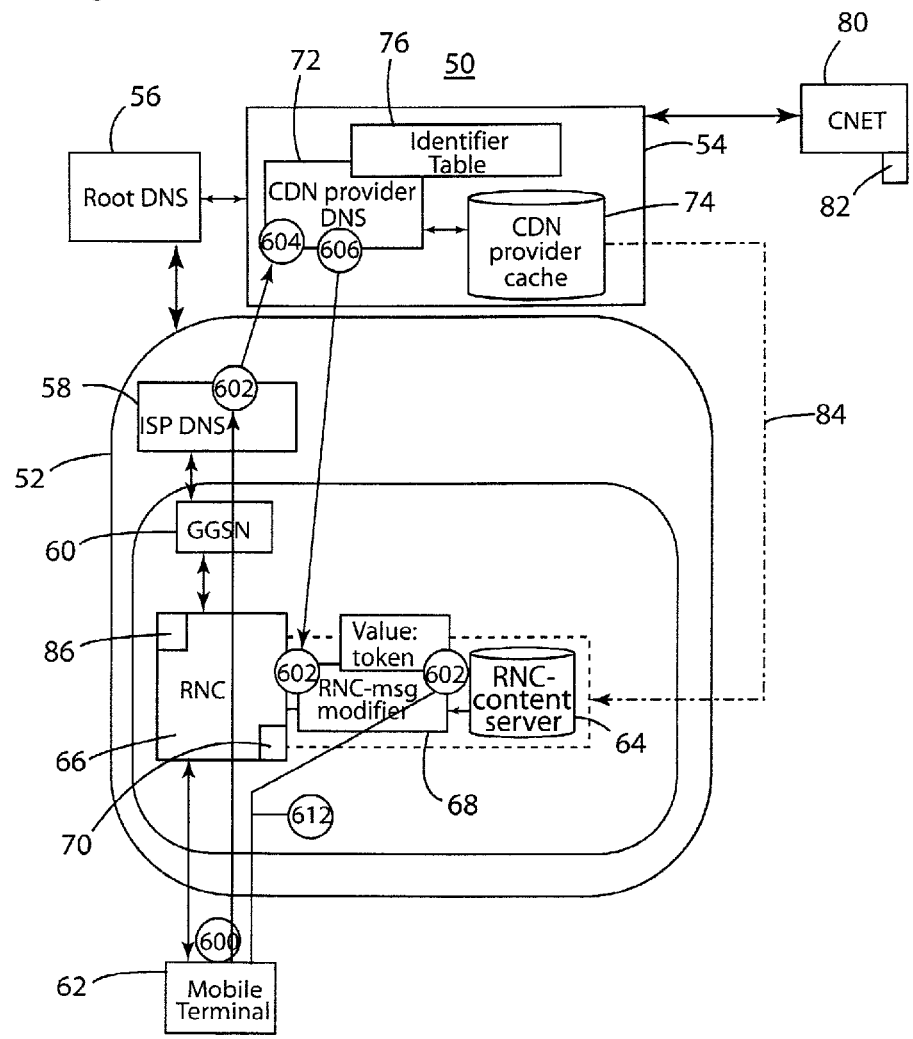
FIG. 5 is a schematic diagram of a system with a novel DNS redirecting mechanism according to an exemplary embodiment.

According to an exemplary embodiment illustrated in FIG. 5, a system 50 for providing the desired content to a mobile terminal includes a mobile telecommunication network 52, a CDN delivery provider 54 and a root DNS 56. For simplicity, the CDN delivery provider 54 is consider to only deliver the content and not originate the content. However, the novel exemplary embodiments equally apply to web severe Or services that both create the content and deliver the content. The mobile telecommunication network 52 may be a 3$^{rd}$ Generation Partnership Project (3GPP) mobile network. The architecture of 3GPP mobile networks is built around tunneling since the IP level mobility solution is GPRS Tunneling Protocol (GTP), where GPRS is the General Packet Radio Service tunneling protocol. In this network, the client is given an IP address that does not change and is topologically anchored in a gateway node (the GGSN node), regardless of where the mobile terminal is actually located in the IP domain, e.g., regardless that the mobile terminal is active inside another network and served by a serving node. Other networks that do not use the 3GPP architecture may also use an IP address for a mobile terminal that is not indicative of the real geographical location of the client device. The novel exemplary embodiments to be discussed are applicable to these other networks.

The root DNS 56, as earlier discussed, is a public DNS server that is provided in the public Internet domain. The mobile telecommunication network 52 includes a local DNS server 58 (also called ISP DNS server) and a GGSN node 60. A GGSN node is described in more details in International Patent Application PCT/IB2009/005045, entitled "Optimized Redirection Network Architectures" and assigned to the same assignee as the present application.

A mobile terminal 62 is connected to the network 52 and may have the capability to search/browse the Internet for a desired content. The mobile terminal 62 has been assigned an IP address by the GGSN node 60, which IP address is topologically anchored at the GGSN node 60. Hence, to other networks and/or computers on the Internet (e.g., the CDN delivery provider 54), the mobile terminal 62 appears to be located at the GGSN node 60 even when the mobile terminal roams in another network. If the CDN delivery provider 54 sends a message (including a web page) addressed to the IP address of the mobile terminal 62, the message is routed by Internet routers to the GGSN node 60. If a content server 64 containing the desired information is placed at the RNC 66 level, the existing mechanisms of the CDN delivery provider 54 fail to "see" the content server 64 as the inside topology of the mobile network 52 is not available for outside parties. The content server 64 is more correctly identified to be a resource and this resource is a server, cache, or a proxy server. A resource 64 may be located at each RNC, at selected RNCs or at no RNC.

Thus, according to an exemplary embodiment, an RNC message parser function is implemented at the RNC 66, e.g., in an RNC-message modifier module 68. The RNC message parser function may be implemented in software, in dedicated circuitry, in a processor, or a combination thereof. For simplicity, it is assumed in the following that the RNC message parser function is implemented in a parser module 70 in the RNC 66. Before discussing how the parser module 70 works in the context of the RNC 66, the organization of the CDN delivery provider 54 is briefly discussed next.

The CDN delivery provider 54 may include a CDN delivery provider DNS server 72, and one or more CDN delivery provider caches 74. The CDN delivery provider caches 74 may be distributed around the world. The CDN delivery provider 54 may also include an identifier table 76 that will be discussed later. The CDN delivery provider 54 has its own clients (content originators), an example of which may be xyz. A content originator 80 generates (originates) the content that the mobile terminal 62 is interested in. The CDN delivery provider 54 (e.g., Akamai) is configured to communicate with the content originator 80 and to store the content generated by the content originator 80 on its own caches 74. From these caches 74, the CDN delivery provider 54 provides the desired content to the mobile terminal 62.

However, as already discussed above, the caches 74 may not be the closes caches to the mobile terminal 62. In this respect, the RNC content server 64 may be the closest cache to the mobile terminal 62. The RNC content server 64 may be part of the mobile network 52, may be part of the CDN delivery provider 54 or a combination of these possibilities. More than one RNC content server 64 may exist in the mobile network 52 as discussed later.

For the purpose of the following discussion, it is assumed that the content originators 80 have entered into a business relation with the CDN delivery provider 54 and the content from the content originator 80 is available on the RNC content server 64. It one application, the CDN delivery provider 54 may not be aware of which RNC content server has the desired information. In this application, the CDN delivery provider 54 knows only that the telecommunication network 52 has the desired information but does not exactly where the information is located. Also, the content originators 80 have their own DNS server 82. Further, it is assumed that the mobile network operator does not want to expose the topology of its network to others, e.g., to CDN delivery provider 54, content originator 80, etc. Thus, these parties cannot "see" the internal topology of the mobile network 52. Also, the CDN delivery provider 54 may be configured to directly update the content of the RNC content sever 64 via a communication path 84.

As part of the relationship between the CDN delivery provider 54 and the content originator 80, the CDN delivery provider 54 may assign an identifier to each content originator 80, for example, a number. Also, a unique token is maintained by the CDN delivery provider 54 for each operator who has RNC-content servers 64. In one exemplary embodiment, the token identifies only the operator and not which server of the operator has the content. These tokens are maintained, for example, in the identifier table 76 of the CDN delivery provider 54. The token may be explicit or implicit as will be discussed later.

Figure 6:
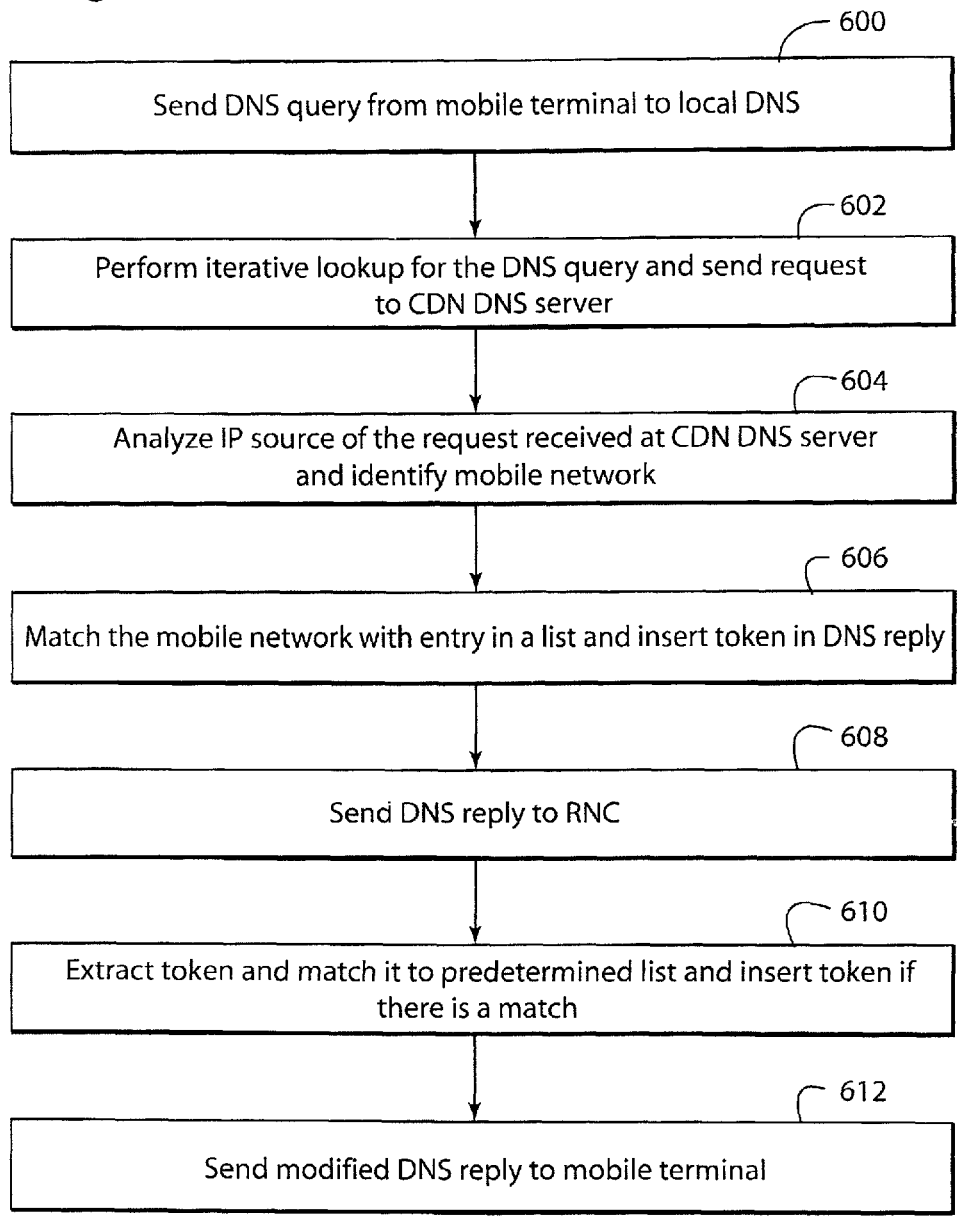
FIG. 6 is a flow chart of a method for DNS redirecting according to an exemplary embodiment.

A method for providing the desired content to the mobile terminal 62 from the RNC content server 64 instead of the CDN server 74 is now discussed with regard to FIGS. 5 and 6. As shown in FIG. 5, the mobile terminal 62 sends in step 600 (see also FIG. 6) a DNS query for an URL of the CDN delivery provider 54. The local DNS 58 receives the query and performs an iterative lookup on behalf of the mobile terminal 62 in step 602. A request is sent to the CDN DNS server 72 of the CDN delivery provider 54. The request may include IP packets having an IP source associated with the local DNS 58. Thus, in step 604, the CDN DNS server 72 of the CDN delivery provider 54 analyzes the IP source of the received request and determines from which local DNS server the request is coming from or originates. In this step, the CDN DNS server 72 determines the operator's telecommunication network from which the request originated.

The CDN delivery provider 54 matches in step 606 the determined telecommunication network with an entry into the table 76 and a token corresponding to the identified mobile network is returned at the conclusion of this step. This token may be inserted into the DNS header 12 of the DNS reply 10 to be sent to the mobile terminal 62. In one application, the token is placed in another field of the DNS reply 10. In still another application, the token is an IP address and it is placed in the answer field (QNAME) 22 of the DNS reply message 10. In still another application, the token is implicit, i.e., the IP address or other piece of information (e.g., a string) already part of the DNS reply is used as the token. The IP address may be the address of a cache identified by the CDN delivery provider as having the desired content. For the implicit token, the IP address or string is not inserted in the DNS reply for the purpose of having a token. In other words, for the implicit token, an existing IP address or string is identified or selected to be the token. If the token is explicit, the token may be located in the additional field 20 of the RNS reply message 10. The token may be a string, hash or number.

In step 608, the CDN delivery provider 54 sends a DNS reply back to the RNC 66. When the DNS reply arrives at the RNC 66, the parser module 70 intercepts the message. In step 610, the parser module 70 extracts the token (which may be explicit or implicit) from the DNS reply and if the token matches one stored in the list of the RNC 66 (which means that the RNC content server has the necessary content), the parser module 70 either inserts an IP address (associated with a content server at the RNC level) into the DNS reply or uses the RNC message modifier module 68 to perform this function. As already discussed, the interception of the message, the extraction of the token and the IP substitution may be performed by a single module or by various modules provided at the RNC level. FIG. 5 shows an exemplary case in which the interception and the parsing is performed by the parsing module 70 and the IP substitution is performed by module 68. However, other arrangements for performing these functions are possible.

The DNS reply including the IP address of the RNC content server 64 is then sent to the mobile terminal 60 in step 612. The mobile terminal 62 then makes a content fetch request destined to the IP address of the RNC content server 64. Thus, the desired content in this case is served from the RNC content cache 64 in the mobile network 52 and not from an external server 74 or 80 on the Internet. If there is no token in the DNS reply, the reply is allowed to travel to the mobile terminal with the IP address of a cache of the CDN delivery content 54.

As discussed above, the parser module 70 has at least two functions. A first function is to intercept the DNS reply and a second function is to extract the token (implicit or explicit). The parser module 70 may also be configured to substitute the IP address received from the CDN provider with its own IP address (or another predetermined IP address). In other applications, these three functions may be provided in corresponding modules that cooperate with each other. In still another exemplary embodiment, the modules may be distributed in the mobile network.

Figure 7:
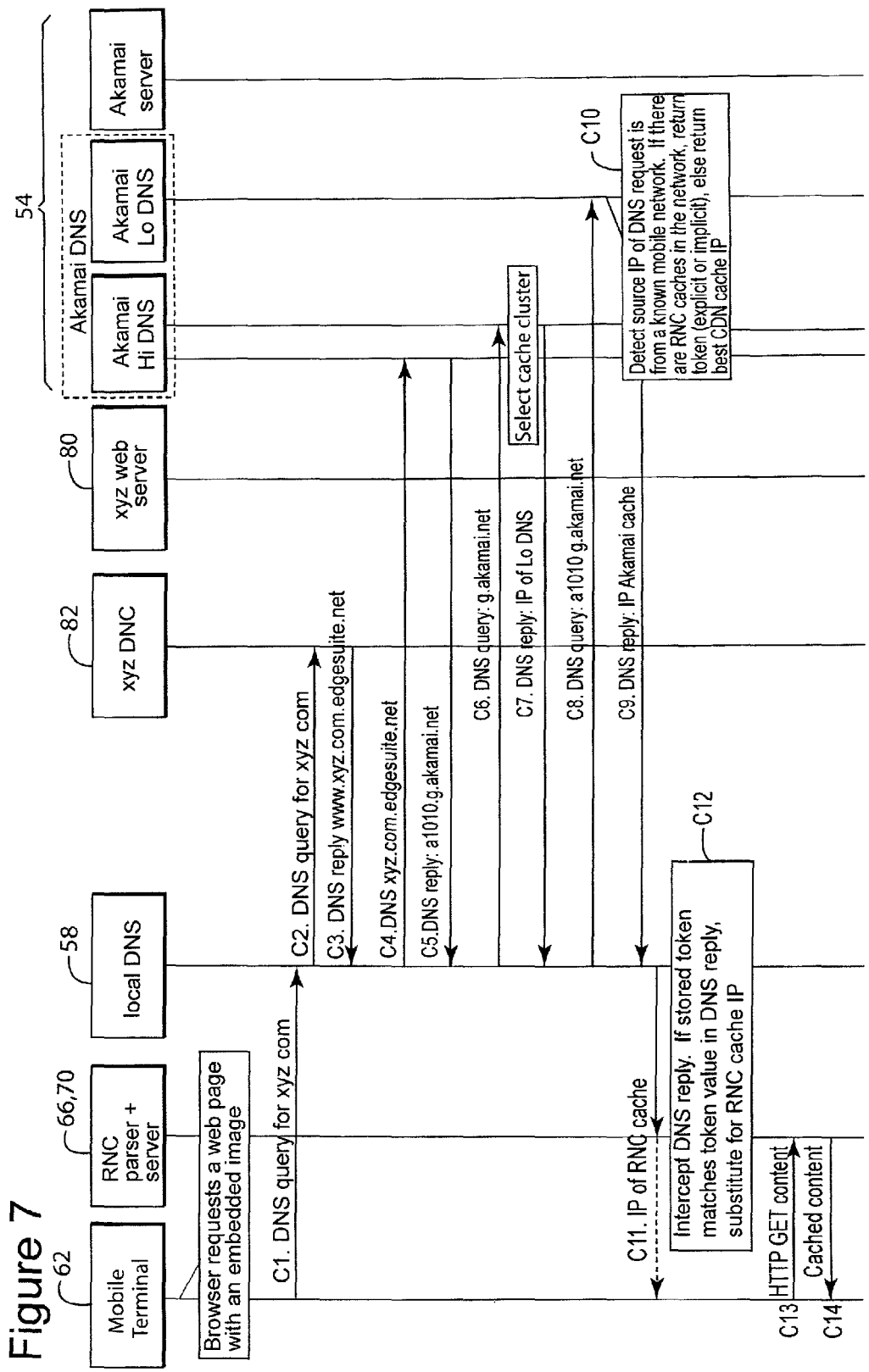
FIGS. 7 and 8 are flow chats of methods for DNS redirecting according to exemplary embodiments.

For illustrating how to implement the above described method in an existing system, the exemplary embodiment illustrated in FIG. 7 is discussed step by step. This implementation is not intended to be limiting the exemplary embodiments. For simplicity, the CDN delivery provider 54 is chosen to be Akamai and the content originator 80 is chosen to be xyz. However, it is noted that the novelty of the exemplary embodiments equally apply to other content delivery providers and content originators. The method illustrated in FIG. 7 assumes that the function CNAMing of Akamai was used to akamaize the xyz's web pages and the mobile terminal 62 uses a web browser for requesting a web page having an embedded image.

In step C1, the mobile terminal 62 makes a recursive DNS query for a domain name (xyz.com) to the local DNS server 58. The local DNS server 58 forwards the request in step C2 to the xyz DNS 82. The xyz DNS 82 returns to the local DNS 58, in step C3, a DNS reply including the CNAMEd www.xyz.com.edgesuite.net. The local DNS 58 queries in step C4 the CDN delivery provider 54 about the CNAMEd domain name and receives in step C5 an URL of the Akamai web server 54. The local DNS 58 exchanges in steps C6 to C9 a couple of messages with the Akamai web server 54 for determining the IP address of the Akamai cache that holds the desired content. In step C10, the Akamai web server 54 determines the source IP of the DNS request and decides whether RNC content servers of the telecommunication network may provide the desired content and returns a token IP address or select the best cache. Then, the local DNS 58 sends in step C11 the IP address provided by Akamai to the mobile terminal 62. This step is interrupted by the parser module 70 (or another module of the RNC) for intercepting the DNS reply. If the token of the DNS reply matches a token value stored in the RNC (and this is true irrespective of the RNC of the telecommunication network), the IP address of the Akamai web server 54 is substituted by the IP address of the content server 64 of the RNC (if available, otherwise no substitution is performed) and the parser module forwards the modified DNS reply to the mobile terminal. In step C13, the mobile terminal requests the IP address received in the DNS reply and in step C14 the desired content from the RNC or the Akamai web server is provided to the mobile terminal 62.

Figure 1:
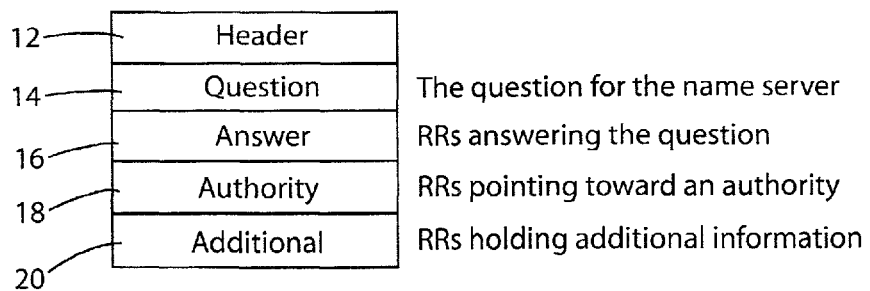
FIG. 1 is a schematic diagram of a DNS reply.
Figure 2:
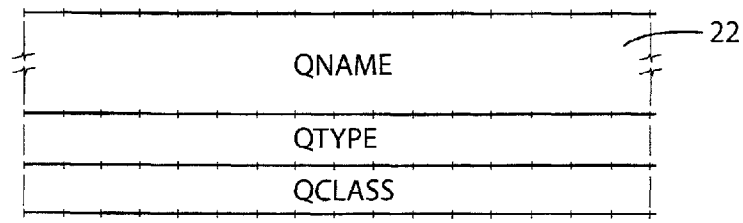
FIG. 2 is a schematic diagram of a field of a DNS reply.
Figure 3:
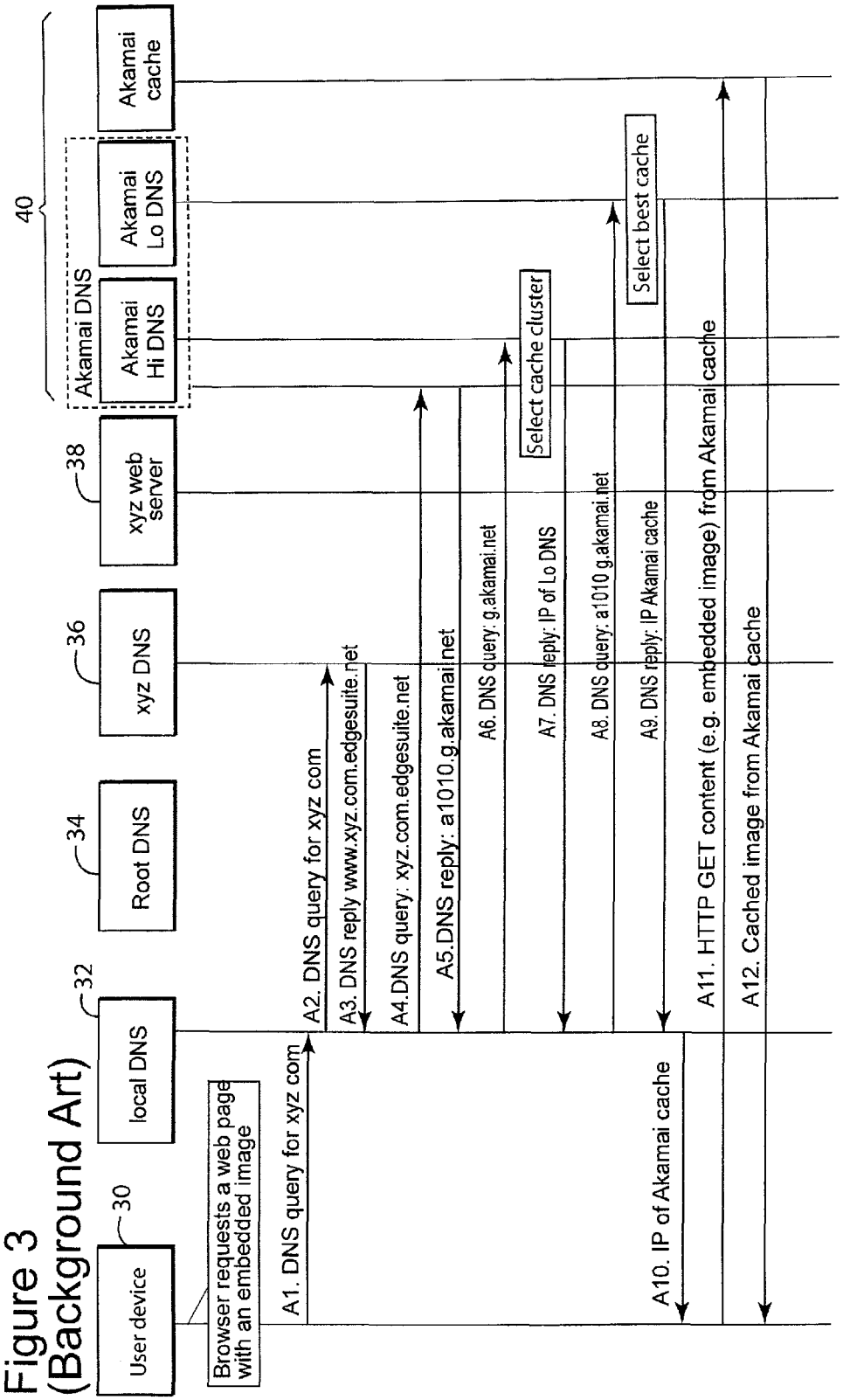
FIG. 3 is a flow chart of a method for DNS redirecting.

It is noted that a difference between FIG. 3 and FIG. 7 is step C10 in FIG. 7. In this step, the CDN delivery provider 54 determines the IP address of the DNS request received from the mobile terminal and also if the desired content is stored in the RNC content server of the mobile telecommunication network. If both these conditions are satisfied, a token is inserted into the DNS reply. Otherwise, the CDN delivery provider 54 determines a best cache available without considering the RNC content server. Another difference between FIGS. 3 and 7 is the step C12 in which the DNS reply is intercepted and checked for the token.

Figure 4:
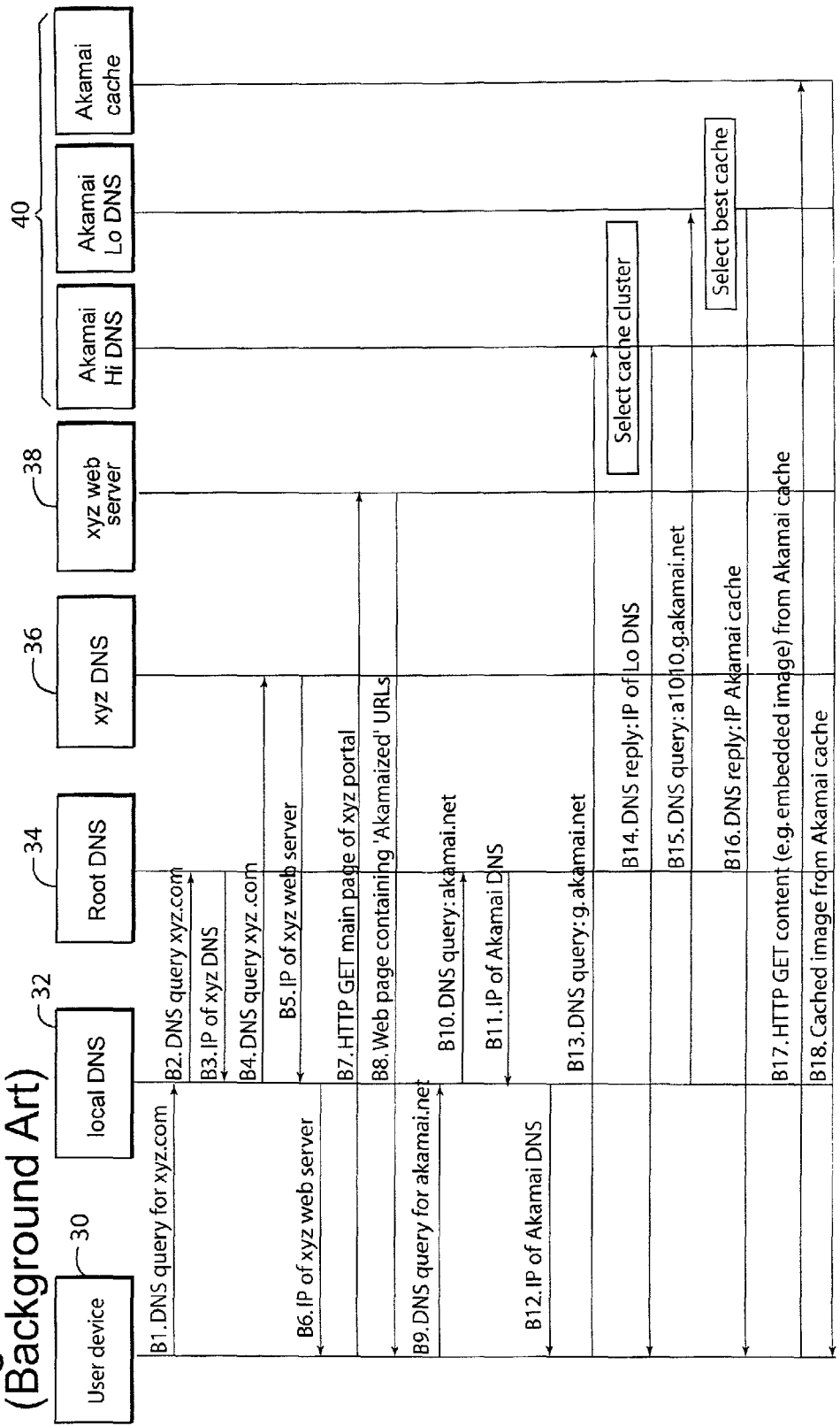
FIG. 4 is a flow chart of another method for DNS redirecting.
Figure 8:
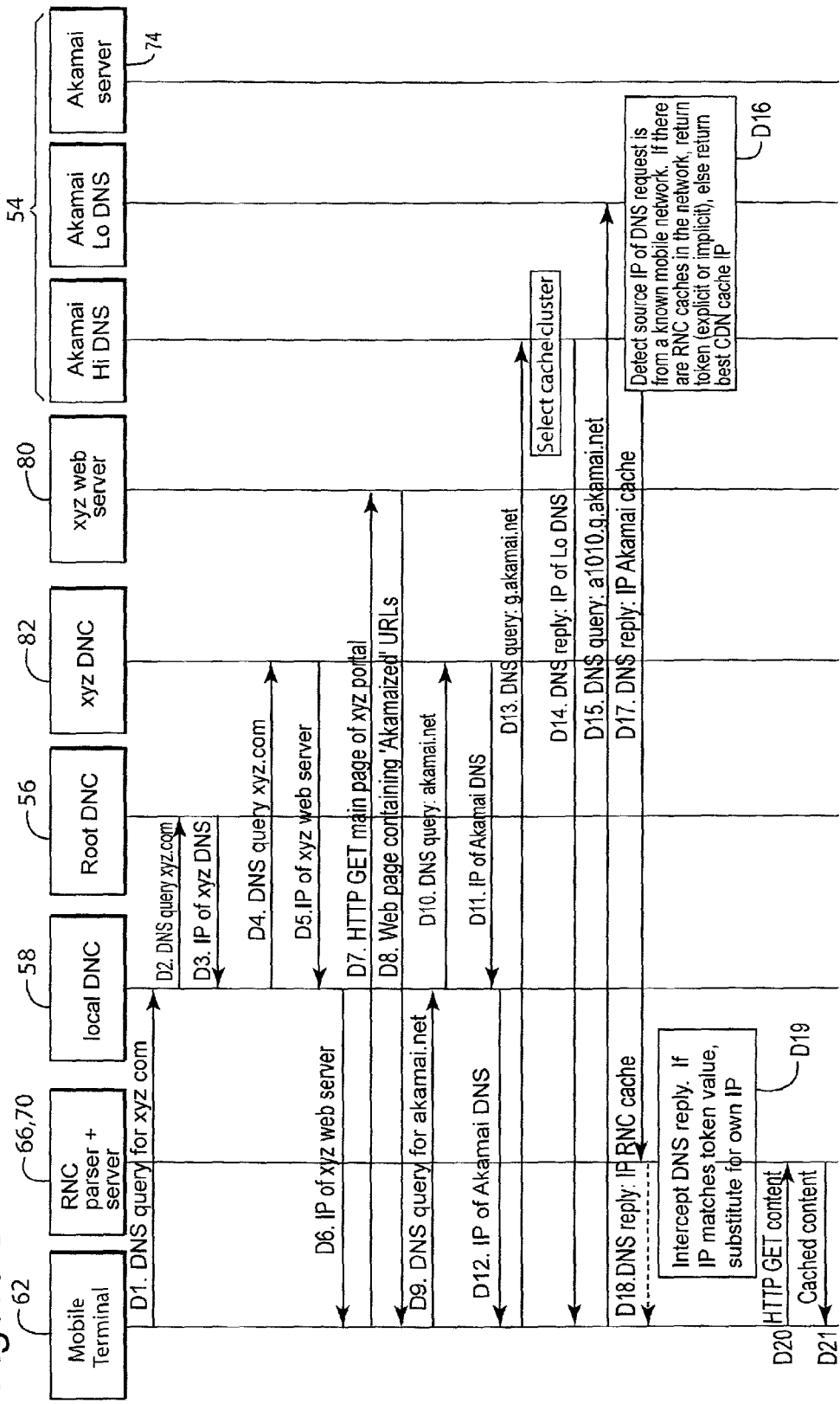

A different implementation is shown in FIG. 8 when instead of using the CNAMing function, the URL of the content originator is akamaized as previously described with regard to FIG. 4. Most of the steps D1 to D22 in FIG. 8 are self illustrative and similar to steps C1 to C14 of FIG. 7 and thus their description is omitted here. However, the two embodiments of FIGS. 7 and 8 are different and one difference is the involvement of the root DNS 56 in FIG. 8 while the method of FIG. 7 does not need this server. Both FIGS. 7 and 8 show the CDN delivery provider 54 as including High DNS and Low DNS servers. However, this structure of the CDN delivery provider is specific for Akamai and different content delivery providers may have different structures. Thus, the structure shown in FIGS. 7 and 8 for the CDN delivery provider is not intended to limit the application of the exemplary embodiments.

The parser module or DNS interceptor module and other modules that perform the steps of intercepting the DNS reply from the CDN delivery provider, parsing the reply, identifying the token and replacing the IP address with another one have been discussed above. A possible implementation of these modules or the logic of them is discussed next with regard to FIG. 9. As this implementation may be achieved by using hardware and/or software, the next exemplary embodiment is discussed in functional terms. Also, some functions discussed next are identified with reference numbers similar to those corresponding to the module likely to support these functions.

Figure 9:
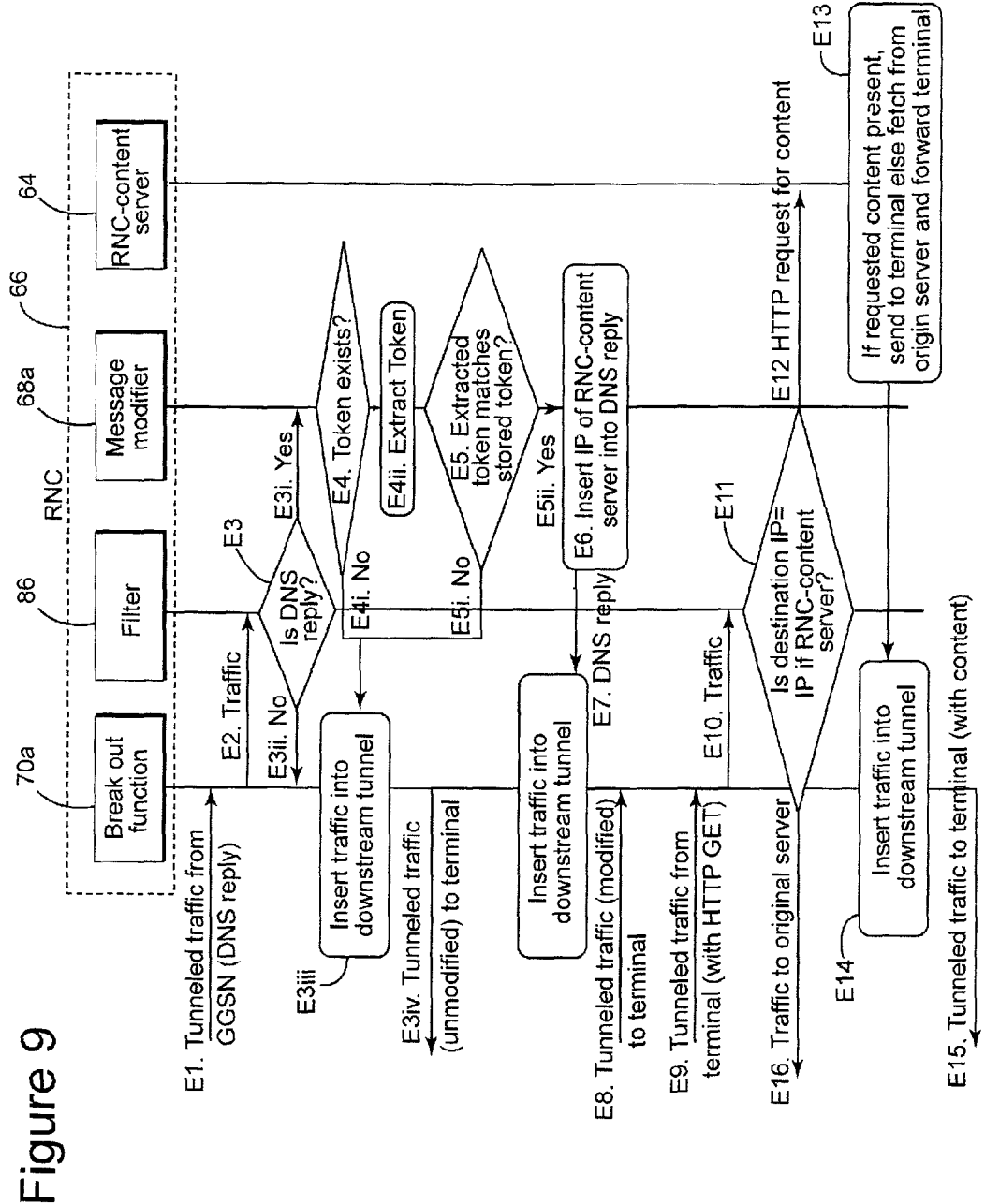
FIG. 9 is a flow chart of a method for illustrating how a DNS reply is used for the DNS redirecting method according to an exemplary embodiment.

In an exemplary embodiment illustrated in FIG. 9, traffic tunneled in step E1 from the GGSN 60 is broken-out at the RNC 66 by a break-out function 70a (this function may be implemented in the parser module 70). The break-out function 70a may be any available mechanism. The break-out function 70a decapsulates the traffic from the GGSN 60 and forwards it in step E2 to the filter function 86. The filter function 86 verifies in step E3 whether the traffic is a DNS query or a DNS reply. In one application, the functions described herein apply only to the DNS reply and not to a DNS query. This step is performed e.g., by checking whether the traffic destination user datagram protocol (UDP) port is 53 (default UPD port). If the traffic is a DNS reply, then the message is forwarded in step E3i to the message modifier function 68a. If the traffic is not a DNS reply and hence of no further interest, then the message is forwarded in step E3ii back to the break-out function 70a. The break-out function inserts in step E3iii the unmodified traffic into the downstream tunnel and the traffic is sent on its normal path towards the mobile terminal in step E3iv.

If the message is a DNS reply, the message modifier function 68a checks in step E4 if a token exists in the DNS reply. If the token is not present in the DNS reply, the traffic is sent unchanged to the mobile terminal in step E4i. However, if the token is present, it is extracted in step E4ii for further processing. This processing may include matching in step E5 the extracted toke with the stored token in the message modifier function 68a. As already mentioned, the token may be implicit or explicit. If the extracted token does not match the stored tokens in step E5, the traffic is sent unchanged in step E5i to the mobile terminal. However, if there was a match of the extracted and stored tokens, further processing is performed on the DNS reply.

This processing includes a step E6 in which the message modifier function 68a inserts the IP address of the RNC content server into the answer part of the DNS reply, thereby pointing the mobile terminal to the RNC-content server as the content source. After this modification, the modified DNS reply is sent to the break-out function in step E7 from where the tunneled traffic is sent in step E8 to the mobile terminal.

In step E9, the mobile terminal attempts to fetch the content of the URL based on the IP address of the RNC-content server received in step E8. The tunneled traffic with the command HTTP GET is intercepted by the break-out function 70a which decapsulates the traffic. The traffic is then forwarded in step E10 to the filter 86 which checks in step E11 whether the requested IP address is directed for the RNC content server. If this is true, the request is forwarded in step E12 to the RNC content server. The RNC content server may behave in a standard manner (e.g., as determined by Akamai). In one exemplary embodiment, the RNC content server may be programmed to download the content required by the user from the CDN delivery provider, thus populating the RNC content server. Later, when another user requires the same content, the RNC content server will provide that content more quickly. Thus, the desired content server is either downloaded in advance or may be downloaded only when required by the first user. The download may take place from the original server 80 or from another content server 74. Upon receiving the desired content, that content is inserted in step E14 into the tunnel and forwarded to the mobile terminal in step E15.

If the result of step E11 is that the desired content is not present in the RNC content server and cannot be downloaded from another server, then the filter module 86 allows the request to proceed to the intended IP address in step E16.

Figure 10:
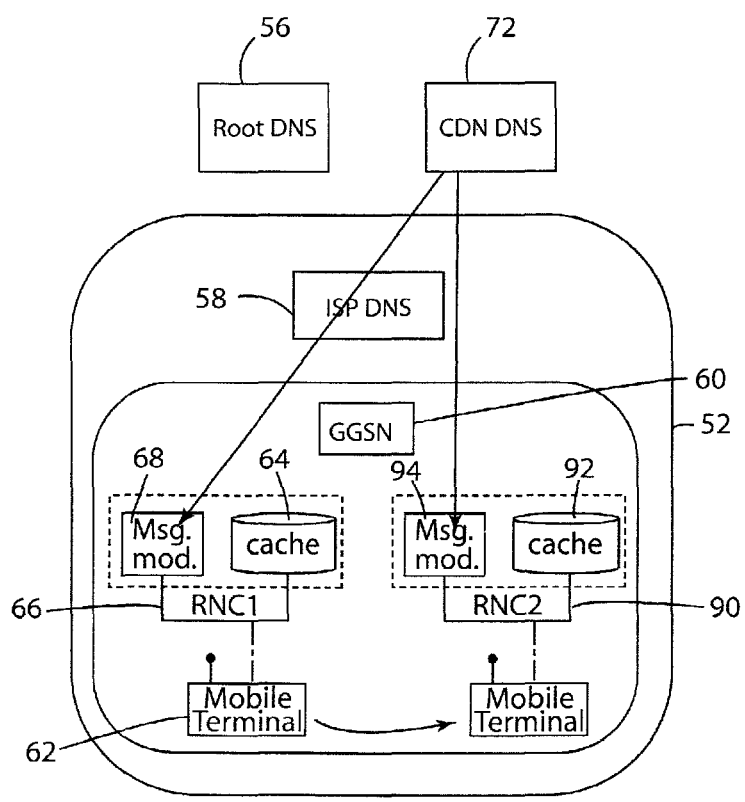
FIG. 10 is a schematic diagram of a system having multiple content servers according to an exemplary embodiment.

The exemplary embodiments discussed above also address the issue of mobility because when the mobile terminal moves to a new RNC, the parser module of the new RNC will intercept and insert its content server's IP address into the DNS reply and point the mobile terminal to fetch content from a corresponding RNC content server if the case. This is illustrated in FIG. 10 in which the new RNC 90 has its own content server 92 and parser module 94.

Some of the advantages of the above exemplary embodiments are now discussed. One or more of the solutions discussed above enable vendors of 3G/4G equipment to inter-work with the Internet CDN players (e.g., Akamai) and the mobile network operators for offering an improved service than that currently possible by impacting QoE, and attracting new customers. Some of the exemplary embodiments describe an inter-working solution between DNS based redirection solutions (e.g., Akamai) and 3GPP networks. For these exemplary embodiments, no changes are needed on either the content delivery provider or the 3GPP systems apart from the introduction of a new function or functions at the RNC level. These new functions may be implemented in software, in a new module to be added to the RNC or a combination of these possibilities.

Some of the exemplary embodiments offer an improved QoE that was not possible before as the caches can now be placed below the GGSN. Also, some of the exemplary embodiments accommodate terminal mobility, e.g., the RNC content server above the mobile terminal can be accessed at any given moment to provide the desired content. As the RNC content server is likely to be provided closer to the mobile terminal than the CDN delivery provider, a decrease in latency may be expected.

Figure 11:
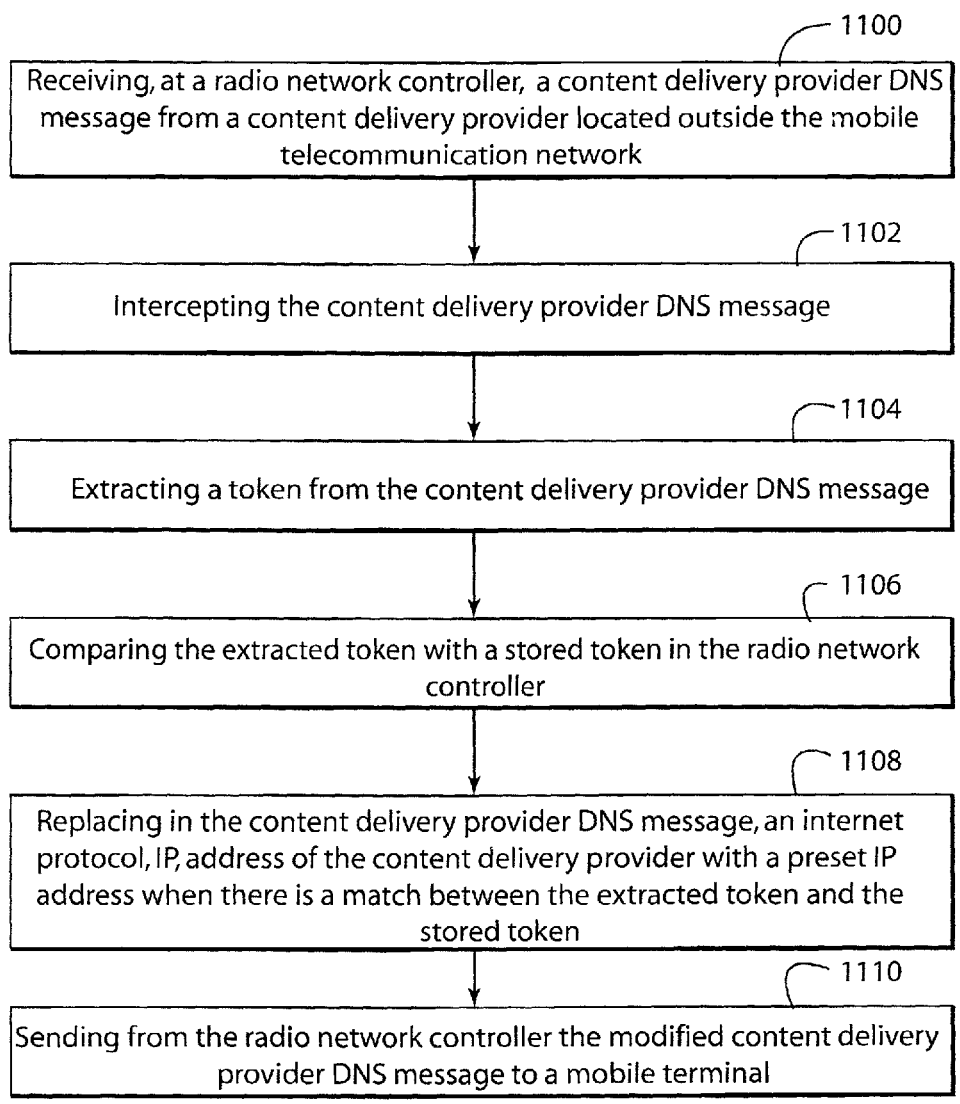
FIG. 11 is a flow chart of a method for DNS redirecting in a radio network controller according to an exemplary embodiment.
Figure 12:
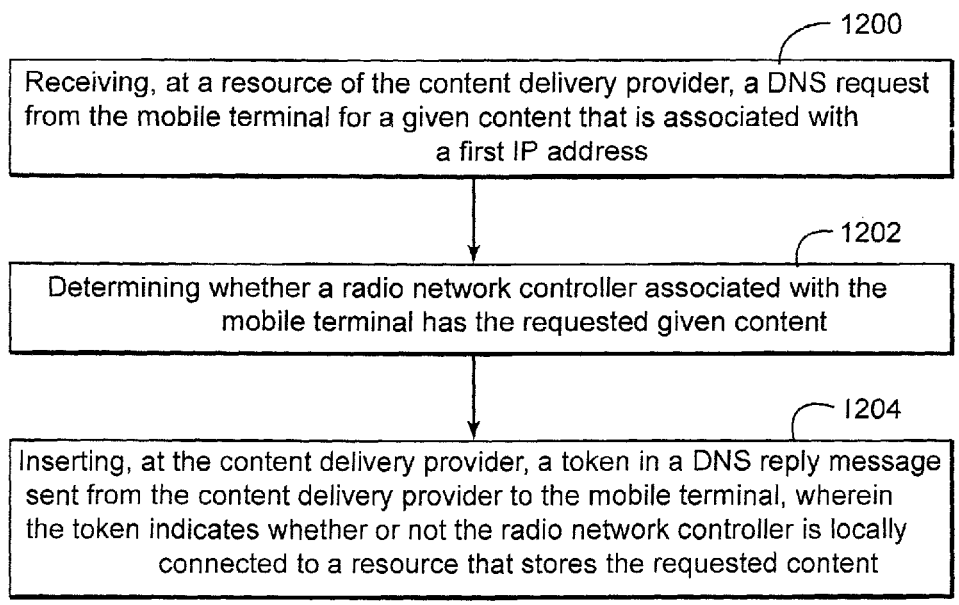
FIG. 12 is a flow chart of a method for DNS redirecting in a content delivery provider according to an exemplary embodiment.

According to an exemplary embodiment illustrated in FIG. 11, there is a method for enabling DNS redirection in a mobile telecommunication network. The method includes a step 1100 of receiving, at a radio network controller (66), a content delivery provider DNS reply from a content delivery provider (54) located outside the mobile telecommunication network (52); a step 1102 of intercepting the content delivery provider DNS reply; a step 1104 of extracting a token from the content delivery provider DNS reply; a step 1106 of comparing the extracted token with a stored token in the radio network controller (66); a step 1108 of replacing in the content delivery provider DNS reply, an IP address of the content delivery provider (54) with a preset IP address when there is a match between the extracted token and the stored token; and a step 1110 of sending from the radio network controller (66) the modified content delivery provider DNS reply to a mobile terminal (62).

According to another exemplary embodiment, there is a method for distributing content from a content delivery provider to a mobile terminal of a mobile telecommunication network. The method includes a step 1200 of receiving, at a content server (74) of the content delivery provider (54), a domain name server, DNS, request from the mobile terminal (62) for a given content that is associated with a first internet protocol, IP, address; a step 1202 of determining whether a radio network controller (66) associated with the mobile terminal (62) has the requested given content; and a step 1204 of inserting, at the content delivery provider (54), a token in a DNS reply message sent from the content delivery provider (54) to the mobile terminal (62), wherein the token indicates whether or not the radio network controller (66) is locally connected to a content server (64) that stores the requested content.

Figure 13:
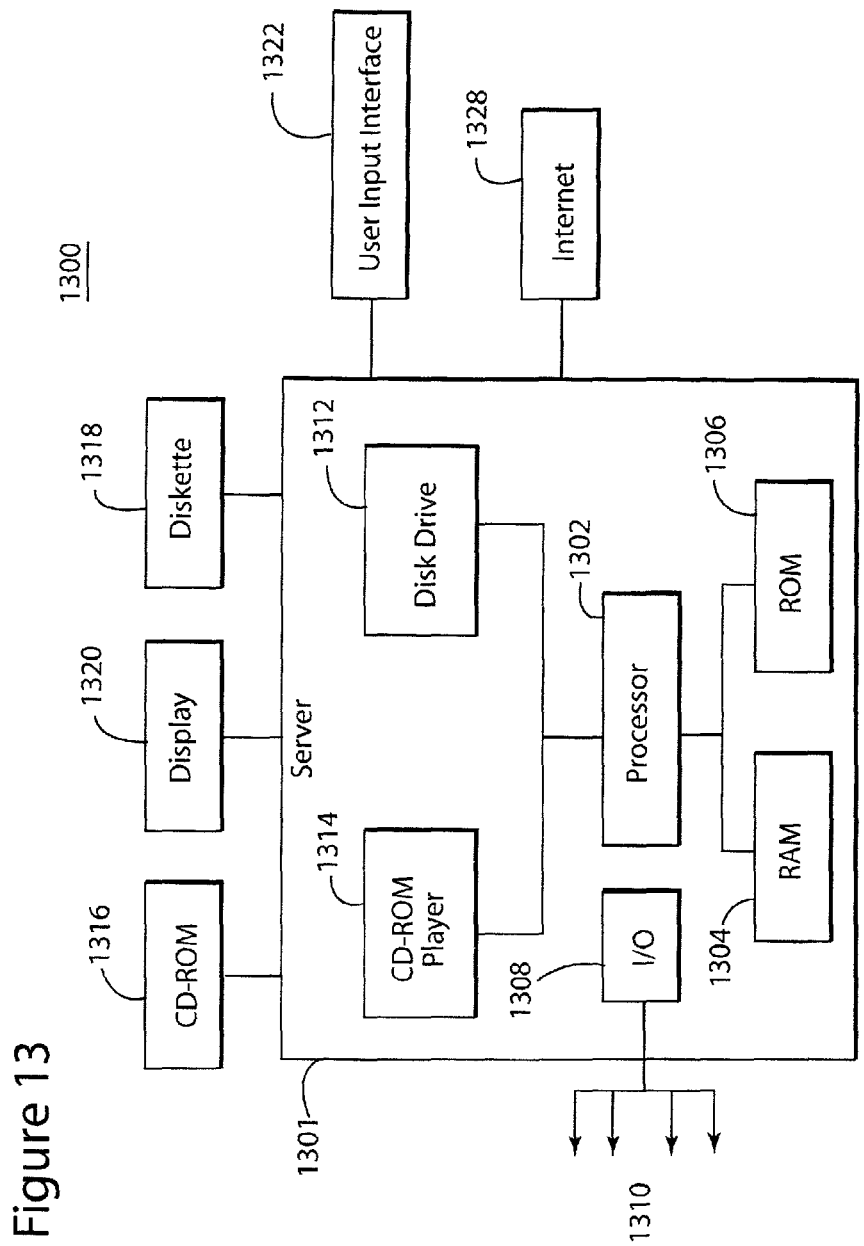
FIG. 13 is a schematic diagram of a module.

An example of a representative module capable of carrying out operations in accordance with the servers of the exemplary embodiments is illustrated in FIG. 13. Hardware, firmware, software or a combination thereof may be used to perform the various steps and operations described herein. The module 1300 of FIG. 13 is an exemplary computing structure that may be used in connection with such a system.

The exemplary module 1300 suitable for performing the activities described in the exemplary embodiments may include a server 1301. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as is known in the art, as dictated by software and/or firmware instructions.

The server 1301 may also include one or more data storage devices, including hard and floppy disk drives 1312, CD-ROM drives 1314, and other hardware capable of reading and/or storing information such as DVD, etc. In one embodiment, software for carrying out the above discussed steps may be stored and distributed on a CD-ROM 1316, diskette 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD displays, plasma display, cathode ray tubes (CRT), etc. A user input interface 1322 is provided, including one or more user interface mechanisms such as a mouse, keyboard, microphone, touch pad, touch screen, voice-recognition system, etc.

The server 1301 may be coupled to other computing devices, such as the landline and/or wireless terminals via a network. The server may be part of a larger network configuration as in a global area network (GAN) such as the Internet 1328, which allows ultimate connection to the various landline and/or mobile client/watcher devices.

The disclosed exemplary embodiments provide a system, a method and a computer program product for DNS redirection in a mobile telecommunication network. It should be understood that this description is not intended to limit the invention. On the contrary, the exemplary embodiments are intended to cover alternatives, modifications and scope of the invention as defined by the appended claims. Further, in the detailed description of the exemplary embodiments, numerous specific details are set forth in order to provide a comprehensive understanding of the claimed invention. However, one skated in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A radio network controller of a mobile telecommunication network, the radio network controller being configured to transfer a content delivery provider domain name system, DNS, reply from a content delivery provider outside the mobile telecommunication network and being located above a GGSN to a mobile terminal connected to the mobile telecommunication network, the radio network controller comprising:
    an interface configured to receive the content delivery provider DNS reply;
    circuitry connected to the interface and configured to extract a token from the content delivery provider DNS reply, wherein the token was introduced into the content delivery provider DNS reply by the content delivery provider,
    wherein the circuitry is configured to intercept the content delivery provider DNS reply when arriving from the content delivery provider, compare the token with a stored token, and replace in the content delivery provider DNS reply an internet protocol, IP, address associated with a cache in the content delivery provider with a preset IP address associated with a resource associated with the radio network controller and located below the GGSN when there is a match between the token and the stored token; and
    the interface is configured to send to the mobile terminal the content delivery provider DNS reply with the preset IP address instead of the content delivery provider's cache IP address.

2. The radio network controller of claim 1, wherein the token is explicitly present in a section of the content delivery provider DNS reply as a string or a number or a hash.

3. The radio network controller of claim 1, wherein the token is implicitly provided in a section of the content delivery provider DNS reply as an IP address associated with the content delivery provider's cache.

4. The radio network controller of claim 1, wherein the preset IP address is associated with the resource in the radio network controller.

5. The radio network controller of claim 1, wherein the resource is connected to the radio network controller and is configured to store content from the content delivery provider.

6. The radio network controller of claim 1, further comprising:
    a storage device connected to the circuitry and configured to store the preset IP address and other preset IP addresses.

7. The radio network controller of claim 1, wherein the resource is one of a server, a cache or a proxy server.

8. A method for enabling domain name system, DNS, redirection in a mobile telecommunication network, the method comprising:
    receiving, at a radio network controller located below a GGSN, a content delivery provider DNS reply from a content delivery provider located outside the mobile telecommunication network and above the GGSN;
    intercepting the content delivery provider DNS reply;
    extracting a token from the content delivery provider DNS reply;
    comparing the extracted token with a stored token in the radio network controller;
    replacing in the content delivery provider DNS reply, an internet protocol, IP, address of the content delivery provider with a preset IP address when there is a match between the extracted token and the stored token; and
    sending from the radio network controller the modified content delivery provider DNS reply to a mobile terminal.

9. The method of claim 8, further comprising:
    storing, in a resource associated with the radio network controller that handles the content delivery provider DNS reply, content from the content delivery provider.

10. The method of claim 9, wherein the preset IP address is associated with the resource.

11. The method of claim 8, further comprising:
    repeating the steps of claim 8 in a new radio network controller when the mobile terminal moves from the radio network controller to the radio network controller.

12. The method of claim 8, further comprising:
    receiving, at the radio network controller, a request from the mobile terminal for content stored in a resource associated with the radio network controller and the request having the preset IP address instead of the content delivery provider IP address.

13. The method of claim 8, wherein the token is explicitly present in a section of the content delivery provider DNS reply as a string or a number or a hash.

14. The method of claim 8, wherein the token is implicitly provided in a section of the content delivery provider DNS reply as an IP address associated with a cache or server of the content delivery provider.

15. A radio network controller in a mobile telecommunication network and below a GGSN, the radio network controller being configured to transfer a content delivery provider domain name system, DNS, message from a content delivery provider outside the mobile telecommunication network and above the GGSN to a mobile terminal connected to the mobile telecommunication network, the radio network controller comprising:
    an interface configured to receive the content delivery provider DNS reply;
    a routine configured to run on a processor to intercept the content delivery provider DNS reply when arriving from the content delivery provider, extract a token from the content delivery provider DNS reply, compare the extracted token with a stored token, and replace in the content delivery provider DNS reply an internet protocol, IP, address of the content delivery provider with a preset IP address when there is a match between the extracted token and the stored token; and
    the interface is configured to send to the mobile terminal the content delivery provider DNS reply with the preset IP address instead of the content delivery provider IP address.

16. The radio network controller of claim 15, further comprising:
    a resource connected to the RNC and configured to store content from the content delivery provider, wherein the resource is one of a server, cache or proxy server.

17. The radio network controller of claim 16, wherein the preset IP address is associated with the resource.

18. The radio network controller of claim 15, further comprising:
    a storage device configured to store the preset IP address.

19. The radio network controller of claim 15, wherein the token is explicitly present in a section of the content delivery provider DNS reply as a string or a number or a hash.

20. The radio network controller of claim 15, wherein the token is implicitly provided in a section of the content delivery provider DNS reply as an IP address associated with the content delivery provider.

21. A method for distributing content from a content delivery provider to a mobile terminal of a mobile telecommunication network, the method comprising:
receiving, at a domain name server, DNS, of the content delivery server, a DNS request from the mobile terminal for a given content that is associated with a first internet protocol, IP, address;
determining whether the mobile telecommunication network associated with a radio network controller serving the mobile terminal has the requested given content; and
inserting, at the content delivery provider, a token in a DNS reply message sent from the content delivery provider to the mobile terminal, wherein the token indicates whether or not content requested by the mobile terminal is available in the mobile telecommunication network.

22. The method of claim 21, further comprising:
determining whether the mobile telecommunication network has the requested given content by comparing a source IP of the DNS request with a preset table.

23. The method of claim 22, further comprising:
storing the requested given content on a resource associated with the radio network controller.

24. The method of claim 21, further comprising:
updating a resource of the radio network controller with the requested given content by the content delivery provider.

25. The method of claim 21, further comprising:
receiving the requested given content from a content originator server.

26. The method of claim 21, further comprising:
receiving content from plural content originator servers and distributing the content to caches of the content delivery provider and third party servers,
wherein some of the third party servers are configured to serve mobile telecommunication networks and are linked to corresponding radio network controllers.

27. The method of claim 21, further comprising:
intercepting, at the radio network controller, the DNS reply message sent to the mobile terminal;
extracting the token;
comparing the extracted token with a list stored in the radio network controller; and
replacing the first IP address with a second IP address associated with the content server connected to the radio network controller.

28. A domain name system, DNS, server of a content delivery provider configured to redirect a mobile terminal of a mobile telecommunication network, the DNS server comprising:
an interface configured to receive a DNS request from the mobile terminal for a predetermined content that is associated with a first internet protocol, IP, address of a content server of the content delivery provider; and
a processor connected to,
the interface and configured to determine whether a mobile telecommunication network having a radio network controller associated with the mobile terminal has the requested predetermined content, and
insert a token in a DNS reply message sent from the content delivery provider to the mobile terminal, wherein the token indicates whether or not the mobile telecommunication network includes a resource that stores the requested predetermined content.

29. The server of claim 28, wherein the processor is further configured to:
determine whether the mobile telecommunication network has the requested predetermined content based on a source IP of the DNS request.

30. The server of claim 29, wherein the processor is further configured to:
compare an identity of the mobile telecommunication network with a stored table for determining whether the resource is having the predetermined content is present in the mobile telecommunication network.

31. The server of claim 28, wherein the processor is further configured to:
update the resource, which is associated with the radio network controller, with the requested predetermined content.

32. The server of claim 28, wherein the interface is further configured to:
receive the requested predetermined content from a content originator server.

* * * * *